UNITED STATES PATENT OFFICE.

OTTO THIEL, OF LANDSTUHL, GERMANY.

CONVERTER PROCESS.

1,080,606.

No Drawing.

Specification of Letters Patent.   Patented Dec. 9, 1913.

Application filed August 4, 1910. Serial No. 575,481.

*To all whom it may concern:*

Be it known that I, OTTO THIEL, engineer, of Landstuhl, country of the Rhenish Palatinate, Empire of Germany, have invented certain new and useful Improvements in or Relating to Converter Processes, of which the following is a specification.

This invention relates to an improved converter process.

The objects and advantages of the invention will be described in the following specification and be defined by the following claims.

The process according to the present invention is characterized by the fact that the charge of pig metal to be treated is not placed in the converter at once but in two or more parts, the further part or parts of the charge being added at the end of the blast of the first part of the charge or at the end of the supplementary blast, in the case of phosphoric pig, whereupon the complete charge is subjected to the blast to the end and finished, not in a separate furnace, but in the same converter.

An example will best explain the process in question. In a converter charge of 15 tons, the ordinary blast period is generally 13–15 minutes, the preliminary blast 11–12 minutes and the supplementary blast 2–3 minutes.

In the experimental charge, at first 12 tons were poured into the converter. The preliminary blast lasted 7 minutes, the supplementary blast 1m. 15s. and the converter was then tipped over. An analysis of the slag showed 11.44% of iron and 20.24% of $P_2O_5$. The rest of the charge, about three tons, was then poured into the converter. A distinct reaction took place. The converter was turned up, and the blast turned on for another 2m. 5s. An analysis of the slag showed 8.16% of iron, 23.16% of $P_2O_5$, that is to say 3.28% of iron less. The total time of blowing amounted to 10m. 20s., that is to say, 3 minutes less than in ordinary charges. The greater portion of the charge is, therefore, subjected to the blast for a period according to the judgment of the operator, and then the rest added, whereupon the blast is turned on to the combined charge to the end.

Obviously the process is subject to various modifications depending on the quantity of the additional pig iron and on the moment at which the addition is made.

By reducing the percentage of iron in the slag, the waste is reduced. This waste can be still further reduced if, after the blast has been applied to the first portion of the charge, iron ores are introduced into the converter. The addition of iron ores in itself is known, but it was of course only very small, as by far the greatest quantity of the impurities was already removed from the iron bath at the moment in question. In the present process, the addition of ore can be made much greater, owing to the subsequent addition of pig iron, but naturally only in as far as the heat conditions admit it. Such an addition of ore considerably reduced the time of the blast. Additions of pig iron to completely blown charges are well known. They are used for deoxidation, recarbonizing, and higher carbonizing. As long as there is a question of additions after the blowing of the charge is completed, such additions cannot be considered as parts of the charge. The part charges according to the present invention however are not identical with such additions. They form parts of one and the same charge which are subjected to the blast as a complete whole until completion. The size of the complete charge depends on the construction of the converter, the power of the blower, etc., so that one speaks of a 10, 15, 20, 25 tons converter, etc.

The advantages of the new process are as follows: (1) Reduction of the time of blowing by 20–30% and therefore a smaller engine power and smaller consumption of material for getting the converter ready; (2) less waste; (3) larger yield of phosphoric acid in the Thomas slag. It is well known that in hot blast charges a considerable percentage of the phosphoric acid formed, is volatilized. This is avoided in the present case; (4) better quality; (5) possibility of using greater charges; (6) possibility of using greater additions of iron ores in hot blast charges, for, if ore is added at the end of the blowing, a large quantity of impurities still remains.

Having now particularly described and ascertained the nature of my said invention and in what manner the same is to be performed, I declare that what I claim is:

1. A converter process which consists in introducing a portion of the pig metal into the converter, then subjecting the charge to the blast and allowing it to remain in the converter, then introducing more of the charge into the converter and then subjecting the combined charge to the blast to the end, until finished.

2. A converter process which consists in introducing a portion of the pig metal into the converter, then subjecting the charge to the blast and allowing it to remain in the converter, then introducing the remainder of the charge into the converter and then subjecting the combined charge to the blast to the end, until finished.

3. A converter process which consists in introducing a portion of the pig metal into the converter, then subjecting the charge to the blast and allowing it to remain in the converter, then introducing a portion of the remainder of the charge into the converter and then subjecting the combined charge to the blast, then introducing more of the charge into the converter, and subjecting the combined charge to the blast to the end, until finished.

In testimony whereof I have signed my name to this specification in the presence of two subscribing witnesses.

OTTO THIEL.

Witnesses:
ERNEST L. IVES,
MELANIE MANG.

Copies of this patent may be obtained for five cents each, by addressing the "Commissioner of Patents, Washington, D. C."